United States Patent [19]

Park

[11] Patent Number: 5,212,467

[45] Date of Patent: May 18, 1993

[54] OBJECT DETECTING APPARATUS FOR USE IN AUTOMOBILE

[76] Inventor: Byong-Yong Park, San 193-4, Seocho-dong, Seocho-ku, Seoul, Rep. of Korea

[21] Appl. No.: 675,850

[22] Filed: Mar. 27, 1991

[30] Foreign Application Priority Data

Mar. 28, 1990 [KR] Rep. of Korea .................. 1990-4188

[51] Int. Cl.⁵ ........................ B60Q 1/00; G01S 15/00
[52] U.S. Cl. .................................... 340/435; 340/436; 340/903; 340/901; 367/909
[58] Field of Search ................ 340/435, 436, 901, 903, 340/904; 367/909, 13, 107, 112, 93, 94

[56] References Cited

U.S. PATENT DOCUMENTS

| | | | |
|---|---|---|---|
| 3,681,750 | 8/1972 | Larka | 340/903 |
| 3,789,950 | 2/1974 | Strenglein | 340/436 |
| 4,026,654 | 5/1977 | Beaurain | 340/903 |
| 5,059,946 | 10/1991 | Hollowbush | 340/435 |

*Primary Examiner*—Donnie L. Crosland
*Attorney, Agent, or Firm*—Lowe, Price, LeBlanc & Becker

[57] ABSTRACT

An object detecting apparatus for use in automobile is disclosed, and the apparatus includes ultrasonic wave transmitting and receiving units installed at a certain interval. Internally, the apparatus is provided with a single circuit which is capable of performing a functing of maintaining the safety distance with the car following behind during the normal running of the automobile, a function of detecting objects appearing behind during a reverse driving, and a function of making an exact close parking by reverse advancing. The circuit is divided into three sections: and ultrasonic wave transmitting section, a reflected wave receiving section, and a control device.

9 Claims, 5 Drawing Sheets

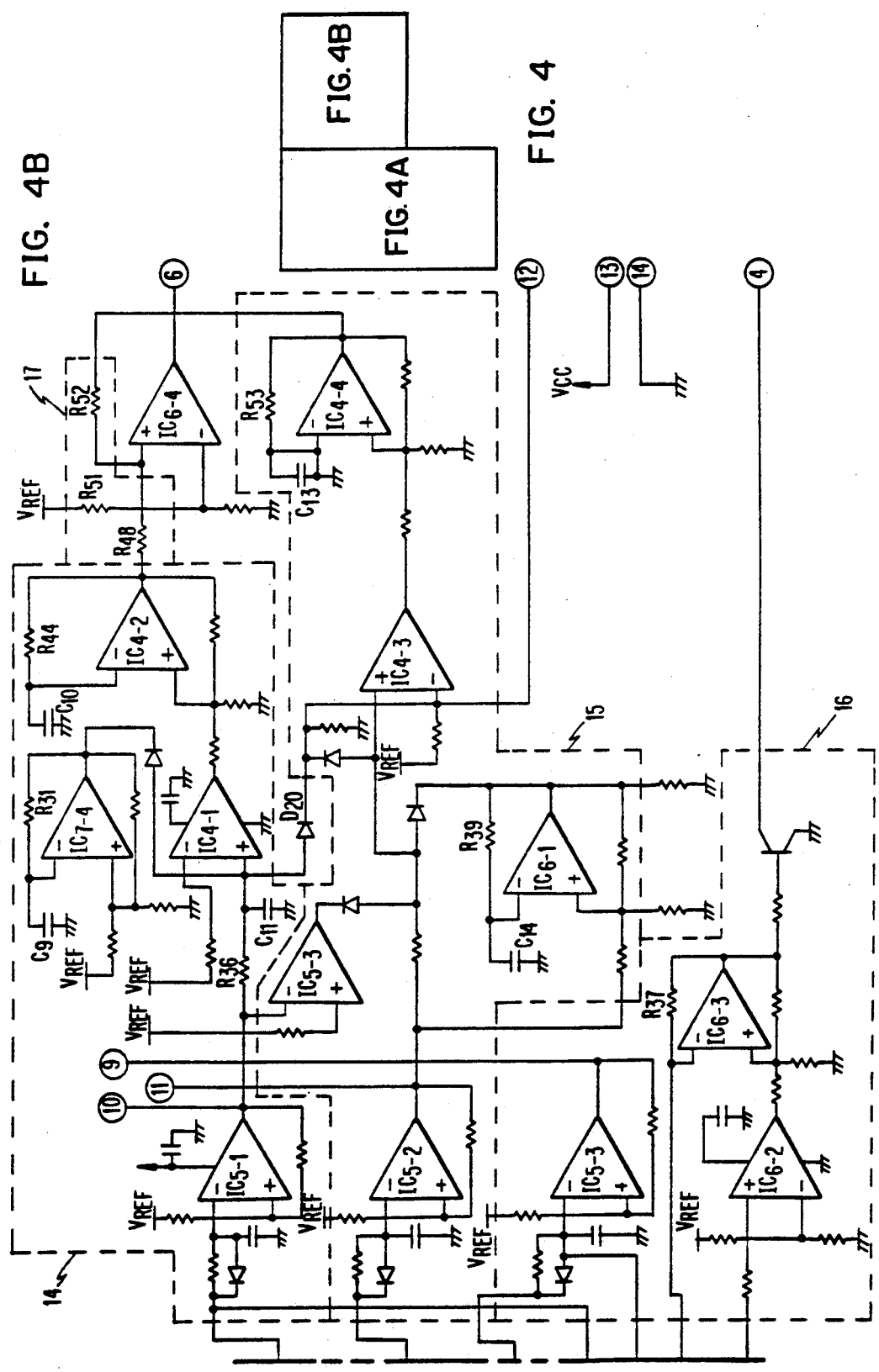

OBJECT DETECTING APPARATUS FOR USE IN AUTOMOBILE

FIELD OF THE INVENTION

The present invention relates to for use in an automobile, which is capable of detecting an object located at a certain distance behind the automobile.

BACKGROUND OF THE INVENTION

Conventionally, as a means for monitoring the rearward travel of an automobile, a mirror or a video camera is installed to permit visual monitoring for obstacles, and therefore, the driver could only watch the rear direction when driving the automobile in the reverse direction. Accordingly, it has been impossible to perform a parking at an exact position, or to prevent the approaching of another car from the rear. However, recently non-visual, methods i.e., infrared ray detector or ultrasonic detector have been developed and put to the practical use to monitor objects at the rear of a vehicle.

However, the infrared detector is not capable of precisely determining the distance of the object due to the color sensitivity of the infrared rays, thereby making it impossible to perform an exact distance detection when parking an automobile. That is, when infrared rays are reflected from a primary color and a black color respectively, a considerable error is generated, so that an exact measurement should be rendered impossible.

Meanwhile, in the case of the ultrasonic detector, although measurement error arising from different colors can be eliminated, its detecting range is very limited, because the ultrasonic apparatus uses a beam type ultrasonic waves. Consequently, its use is limited to only parkings. Further, there is another disadvantage such that a plurality of ultrasonic apparatuses have to be installed if the reliability is to be assured. Further, there are other disadvantages such that: its automatic gain control (AGC) is limited so that a single device cannot measure both near and far objects the apparatus is subject to malfunction in winter seasons due to the lack of a temperature compensation in the circuit resulting in faulty circuit operation.

Further, in this ultrasonic method, the distance of an object is measured based on the reflectivity by measuring the reflected amount of the ultrasonic waves, with the result that its measuring range is very narrow, and its measuring precision is very unreliable.

SUMMARY OF THE INVENTION

The Present invention is intended to overcome the above described disadvantages of the conventional apparatuses.

Therefore it is an object of the present invention to provide an object detecting apparatus for use in an automobile, in which ultrasonic transmitting and receiving apparatuses are installed at a certain interval on the rear portion of the automobile, in such a manner that the distance of the object can be detected by means of the time for the return travel of the ultrasonic waves, thereby making it possible to detect objects over a wide range, to maintain a safety distance during, operation, and to detect an object during a reversing or parking by providing a collision alarm.

It is another object of the present invention to provide an object detecting apparatus for use in an automobile, in which a temperature compensating means is provided in the circuit so that the apparatus can be used without being limited by seasonal conditions.

It is still another object of the present invention to provide an object detecting apparatuse for use in an automobile, in which an automatic gain control circuit is provided, so that the gain controls based on the time can be performed regardless of the magnitude of the distance.

BRIEF DESCRIPTION OF THE DRAWINGS

The above object and other advantages of the present invention will become more apparent by describing in detail the preferred embodiment of the present invention with reference to the attached drawings in which:

FIG. 3 is a detailed circuital illustration of the circuit of

FIG. 2, and

FIG. 4 is a diagram of the orientation of FIGS. 4A and 4B to form a complete schematic diagram.

FIGS. 4A and 4B are schematic diagrams of a control device as a part of the circuit of FIG. 3.

DESCRIPTION OF THE PREFERRED EMBODIMENT

Figure 2:
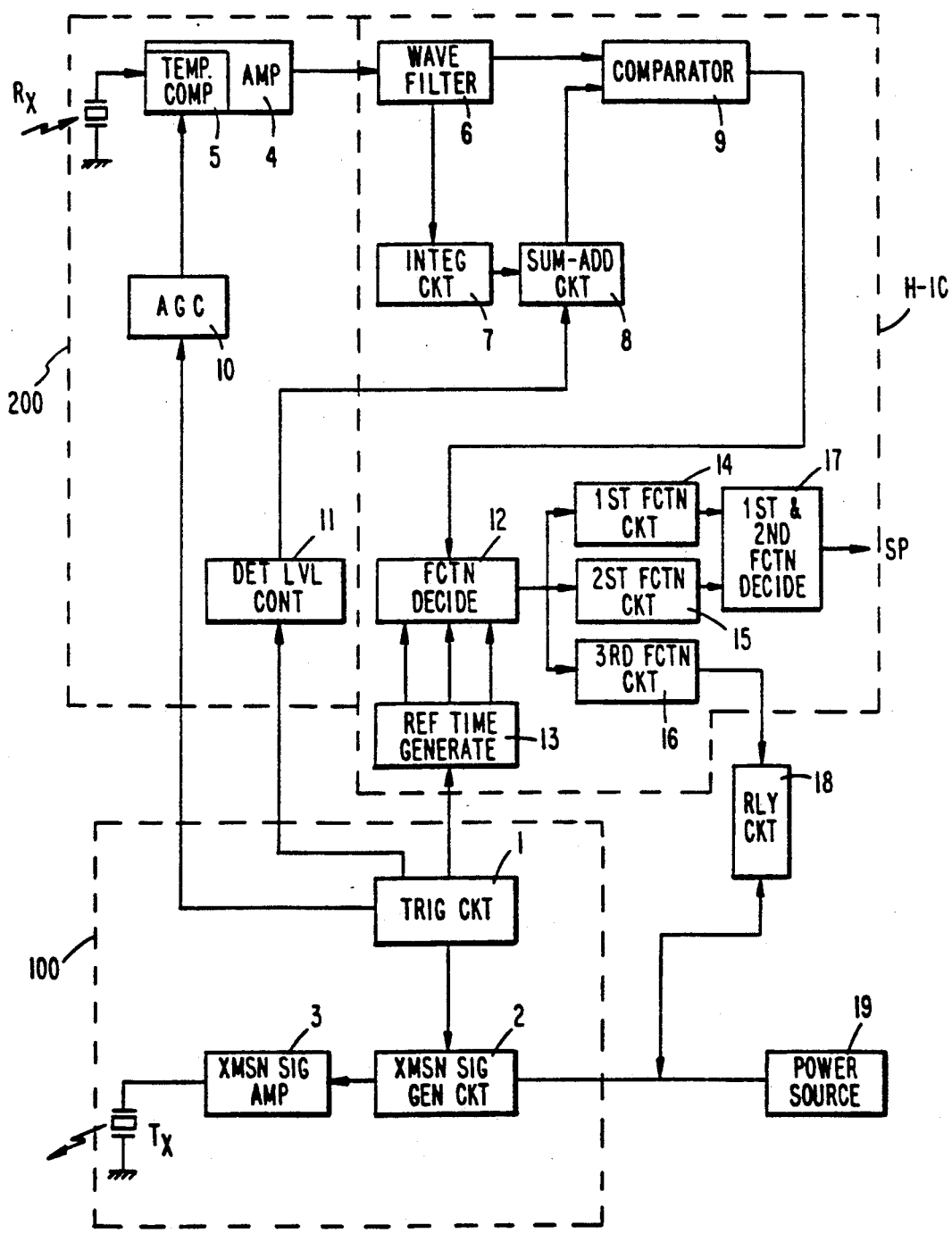
FIG. 2 is a block diagram showing the constitution of the ultrasonic detecting circuit of the present invention.

FIG. 2 is a block diagram schematically showing the structure of the apparatus of the present invention, which performs detecting operations by transmitting and receiving ultrasonic waves. The object detecting apparatus of the present invention comprises: an ultrasonic wave transmitting section 100; a receiving section 200; and a control device H-IC, the sections 100, 200 being connected to the control device H-IC.

The transmitting section 100 includes a trigger circuit 1, a transmission signal oscillation circuit 2, a transmission signal amplifying circuit 3 and a transmitter Tx. The receiving section 200 includes: an automatic gain control circuit 10, a temperature compensating circuit 5, an amplifying circuit 4 and a receiver Rx. The control device H-IC includes: a detection level controlling circuit 11, a function deciding circuit 12, a reference time generating circuit 13, a first function circuit 14, a second function circuit 15, a third function circuit 16, a first and second function judging circuit 17, a wave filtering circuit 6, an integrating circuit 7, a summing-adding circuit 8, and a comparing circuit 9.

Figure 1:
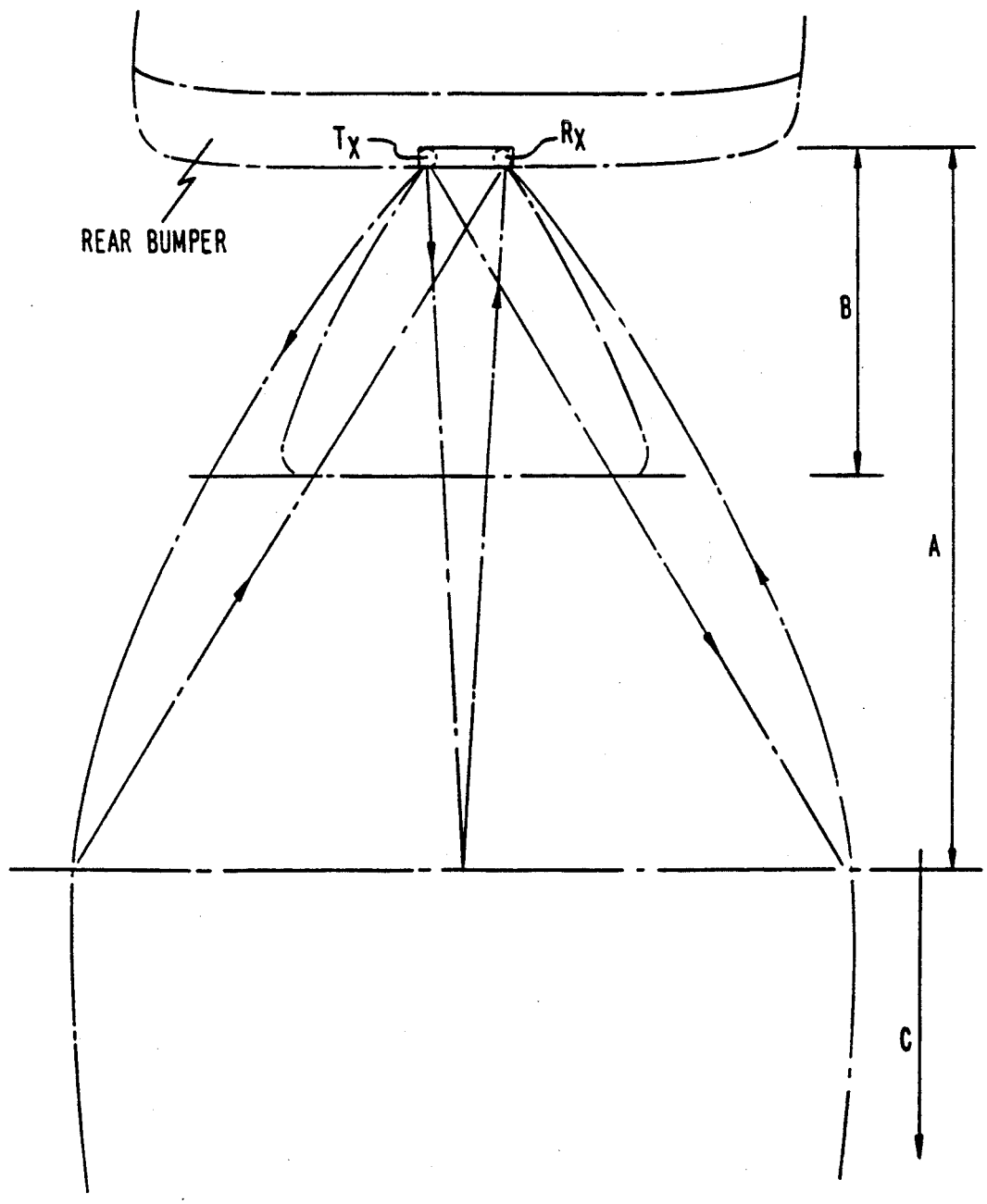
FIG. 1 is a schematical view examplarily showing the object detecting range of the apparatus of the present invention (using ultrasonic waves)

As shown in FIG. 1, ultrasonic waves are outputted from the transmitter Tx which is installed at the centre of the bumper of the automobile. These signals are pulse type signals having vacant periods of time. The length of the off periods is set by means of the time constant of a condenser C20 and a resistance R9 connected to a trigger device IC2-1 of the trigger circuit 1, while the pulse irradiating time is set by the condenser C20 and resistances R10, R9. Further, one pulse time of the high frequency signals constituting the pulse waves is decided by a condenser C22, a variable resistance VR1 and a resistance 18 connected to a signal oscillating device IC2-2 of the transmission signal oscillation circuit(2).

Figure 3:
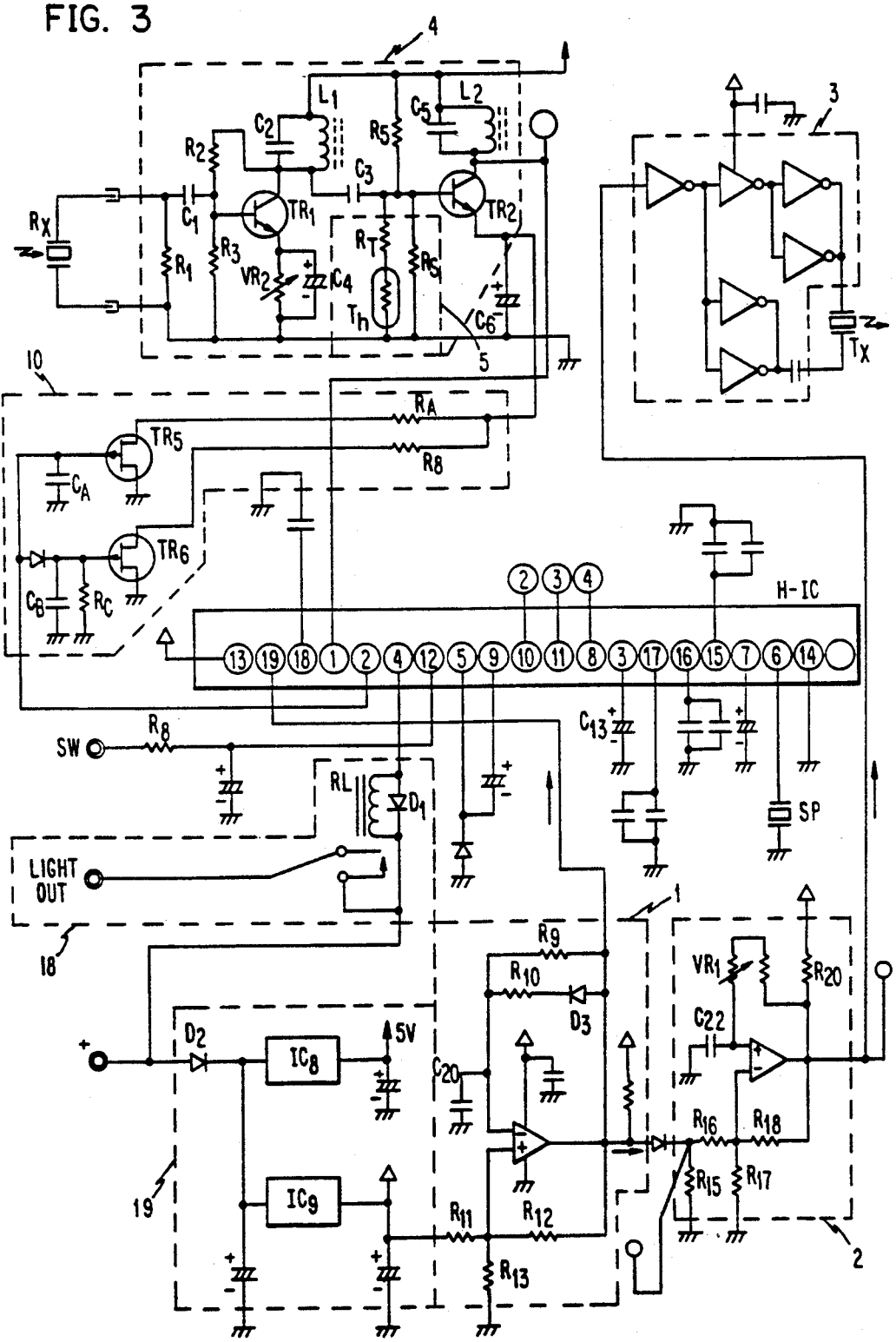

That is, as shown in FIG. 3, the trigger circuit 1 includes resistances R9-R14, a diode D3, condensers C20, C21 and a trigger device IC2-1, while the transmission signal oscillation circuit 2 includes resistances R15–R20, a variable resistance VR1 and a signal oscillating device IC2-2. By a trigger signal oscillation by the trigger circuit 1, a pulse signal having proper vacant intervals are outputted from the transmission signal generating circuit 2, and these signals pass through a transmission signal amplifying circuit to be amplified there before being outputted in the form of ultrasonic waves through the transmitter Tx, the transmission signal amplifying circuit 3 consisting of a plurality of NAND gates.

The ultrasonic waves emitted as described above are reflected from the object appearing at a distance in the rear of the automobile, and come back to the receiver Rx. The ultrasonic waves which have entered into the receiver Rx are transferred to the amplifying circuit 4 consisting of multistep transistors TR1, TR2 to be amplified there, and then, the amplified signals pass the wave filtering circuit 6 of the control device H-IC to undergo an ac filtering process there. The output from the wave filtering circuit 6 is transferred to the integrating circuit 7 and the comparing circuit 9 to be subjected to a comparing process in the form of a comparison between the received signals and the detection level signals, and thereafter, the signals are transferred to the function deciding circuit 12.

The function deciding circuit 12 selects a function from a number of functions which are important in the present invention, such as a close parking function (a first function), a short distance object detecting function (a second function) to be exercised when reverse-driving, a safety distance maintaining function (a third function) for maintaining a safety distance against the car following behind. The signals which have passed the first and second functions produce alarms through a speaker respectively, while, in the case of the third function, the circuit is activated as soon as the automobile following behind comes within 5 meters behind. A relay circuit 18 is activated by the output signal of the third function circuit 16 so as for blinking signals to be produced for a certain period of time, thereby making it possible to maintain a safety distance with the automobile following behind.

The operations described above will described further in more detail below. As shown in FIG. 2, a part of the output of the trigger circuit 1 is inputted into a 19th terminal of the control device H-IC, and passes through a diode D27, a resistance R75, a condenser C25, and the positive input terminal of a delay device IC1-4 to be delayed there.

This delayed output is transferred to a second terminal of the control device H-IC before being supplied to the automatic gain control circuit 10. Meanwhile, the other portion of the output is supplied to the detection level control circuit 11 which consists of a condenser C24, a diode D25, and a resistance R72, and these supplied signals charge the condenser C24.

The output of the detection level control circuit 11 pass through the summing-adding circuit 8 which consists of two resistances R77, R70, and then, the output therefrom is transferred in the form of X signals, i.e., trigger signals to the comparing circuit 9 which consists of a comparator IC1-2 and a condenser C18. In this comparing circuit 9, the signals and noise are compared and separated from each other.

The filtering circuit 6 consists of condensers C16, C17, resistances R66, R67, a diode D24, and a comparator IC1-1, and the output of the filtering circuit 6 is amplified by being transferred to the amplifying circuit 4 which consists of resistances R1–R5, coils L1,L2, condensers C1–C5, and transistors TR1,TR2. Before passing through the amplifying circuit 4, the above mentioned output of the filtering circuit 6 is inputted into the receiver Rx in the form of reflected ultrasonic signals.

The signals amplified by the amplifying circuit 4 are inputted into a first terminal of the control device H-IC where the signals are subjected to an ac filtering. Then the signals are inputted into the positive input terminal of the comparator IC1-2 of the comparing circuit 9 where the signals are subjected to a comparison against the detection level signals, before they are outputted in the form of high level signals. The high level signals thus outputted are supplied to the function deciding circuit 12 consisting of diodes D5–D15, comparators IC7-1, IC7-2, IC7-3, and having a diode AND gate function, thereby making the cathode maintained at a high voltage.

The signals which have passed through the filtering circuit 6 are inputted into the integrating circuit 7 which consists of an computing element IC1-3, a diode D26, and a resistance R68.

The intergrating circuit 7 calculates out an average value of all the signals received from the outside, and decides that this should be noise. Therefore, the integrating circuit 7 charges the average value into the condenser C13 of the third terminal of the control device H-IC in the form of an integral function having a slope for a certain period of time.

Further, this charged values are summed up by utilizing the correcting function of the resistance R77, R71, R70.

Meanwhile, a part of the signals which are inputted through a 19th terminal of the control device H-IC are transferred partly to the base of the transistor +R3 and partly to the input terminal of the comparator IC3-1. The inverted output signals of the transistor TR3 are transferred to the reference time generating circuit 13 which consists of comparators IC3-2, IC3-3, IC3-4. In this reference time generating circuit 13, the comparator IC3-2 controls the time corresponding to 50 cm, the comparator IC3-3 controls the time corresponding to a short distance (1-2 m), and the comparator IC3-4 controls the time corresponding to the safety distance (5 m). The inverted output signals are inputted into the negative terminal of the reference time generating circuit 13, in such a manner that the outputs of the comparators should be supplied to the cathodes of the diodes D7, D10, D14 of the function deciding circuit 12. Meanwhile, the output of the comparator IC3-1 is supplied to the cathodes of the diodes D6, D9, D13 of the function deciding circuit 12, so that any malfunction of the receiver due to the strong initial transmission signals should not occur.

First, if the output of the comparator IC3-2 of the reference time generating circuit 13, which has a delaying functing, has a high level, then the voltage which is supplied through the resistance R14 of the function deciding circuit 12 can not flow through the diodes D5, D6, D7, and therefore, a high level voltage is supplied to the negative terminal of the comparator IC7-1.

Therefore, a low level voltage is outputted through the output terminal of it. Under this condition, in order to prevent the simultaneous operations of the comparators IC7-2, IC7-3, the output of the comparator IC7-1 of the circuit is fed back to the cathodes of the diodes D11, D15, so that the voltage should be pulled down to a low level, and that the comparators IC7-2, IC7-3 for selecting the second and third function should be blocked in a dual form.

Accordingly, if the output signals of the comparator IC7-1 which selects the first function are inputted into the first function circuit 14 which consists of comparators IC7-4, IC4-1, IC4-2, IC5-1, a noise removing resistance R36 and a condenser C11, then these signals are subjected to a delaying and amplification by the comparator IC5-1. Then the output therefrom pass the resistance R36 and the condenser C11 where the noise is removed. Then the output therefrom pass through the comparators IC4-1, IC4-2 to the first and second function deciding circuit 17 which consists of three resistances R48, R51, R52. Then the output therefrom is transferred to the control device H-IC to be outputted through a 6th terminal, and then, to be outputted through the speaker SP in the form of an alarm.

Under this condition, the generation of the discontinuous alarm for the first function (parking) is done by a resistance R31 and a condenser C9 which are the peripheral circuits of the comparator IC7-4, while the stopping of the alarm is done by a resistance R44 and a condenser C10 which are the peripheral circuits of the comparator IC4-2.

Second, if 1,2 m signals are detected by the comparator IC3-3 of the reference time generating circuit 13, its output is supplied to the diode D10 of the function deciding circuit 12, and therefore, the voltage inputted through a resistance R16 is transferred to the comparator IC7-2 for deciding the second function. Then the signals pass through the comparator IC5-2 of the second function circuit 15 which consists of the comparators IC5-2, IC5-3, IC4-3, IC4-4, and the signals are subjected to a delaying and amplification there. Then the signals pass through the comparators IC4-3, IC4-4, and are let pass the speaker where they are converted to an alarm sound.

Under this condition, the discontinuity of the alarm (prealarm) is provided by a resistance R39 and a condenser C14 which are the peripheral circuits of the comparator IC6-1, while the generation of the actual alarm sound is done by a resistance R53 and a condenser C13 which are the peripheral circuits of the comparator IC4-4.

Thus in carrying out the first and second functions, i.e., the reversely parking function and the long distance object detecting function during a reverse driving according to the present invention, the sounds of the preliminary alarm and the parking alarm are produced through a single speaker SP, and the selection of the function is carried out by the first and second function deciding circuit 17.

Further, a reverse gear switch SW is connected through a 12th terminal of the control device H-IC to the comparator IC4-3 of the second function circuit 15, and is also connected to a diode D20 which is connected to the compartor IC4-1 of the first function circuit 14. Accordingly, the first and second functions are permitted to be performed only when the reverse gear switch SW is switched on.

Third, during the running of the automobile, if the automobile following behind violates the safety distance by closely following into within a distance of 5 m (actually 0.5-m), the above described signals are transferred to the comparator IC7-3 after undergoing the above described process, and the comparator IC7-3 performs the selection of the function. Then the signals are inputted into the comparator IC5-4 of the third function circuit 16 which consists of comparators IC5-4, IC6-2, IC6-3, and there, the signals are subjected to a delaying and an amplification. Then the signals are outputted through a 9th terminal of the control device H-IC, and then, are inputted into a 5th terminal of it. Then, the signals are supplied through the comparators IC6-2, IC6-3 to the base of the transistor TR4, so that a relay RL should be driven to generate and alarm.

Under this condition, the blinking frequency is decided by the functions of a resistance R37 and a condenser which is connected to a 7th terminal of the control device H-IC.

Particularly, even if an automobile stays within the safety distance (within 5 m) continuously, the circuit of the present invention gives blinking lights only three times.

In the drawings, reference code Vref indicates an intermediate voltage of the power sources, " ↑ " indicates a positive voltage, the numbers inside "0" indicates the input/output terminals (pin) of the control device H-IC, and 19 indicates a power source circuit for supplying a constant voltage all the time through constant voltage devices IC8, IC9.

In the amplifying circuit 4 of the present invention, there is installed a temperature compensating circuit 5 consisting of resistance RT, RS and a thermister Th, this circuit 5 being disposed at the front of the amplifying transistor TR2. This temperature compensating circuit 5 prevents the errors due to the characteristics of the silicon transistors, such as the problem of the gain reduction liable to occur during the lowering of the temperature, and an abnormal generation of signals due to the increase of the gain during a rise of the temperature.

The temperature compensating circuit 5 according to the present invention is capable of maintaining the gain at a constant value for the whole circuit over a wide range of temperature by carrying out a reverse compensation through the increase of the current of the transistor TR2 during a drop of temperature. Further, at the emitter side of the transistor TR2, there is installed an automatic gain control (AGC) circuit 10 having transistors TR5, TR6 for controlling the gains. This AGC circuit 10 is capable of keeping the gain at a low level during the initial transmission, and, as the time passes, the gain is gradually increased to amplify the received signals, so that the long and short distance signals can be precisely sensed. That is, the AGC circuit receives the trigger pulses through the 19th terminal of the control device H-IC during the pulse transmission to charge them into the condenser C25. During the time when the potential of the condenser C25 is discharged through the resistance R75, the gain of the amplifying circuit 4 for amplifying the received signals is inhibited by blocking the gain controlling transistors TR5, TR6 of the automatic gain control circuit 10 through the 2nd terminal of the control device. Further the AGC circuit performs amplifications with the relevant gains for the close distance, short distance and long distance respectively.

Figure 4A:
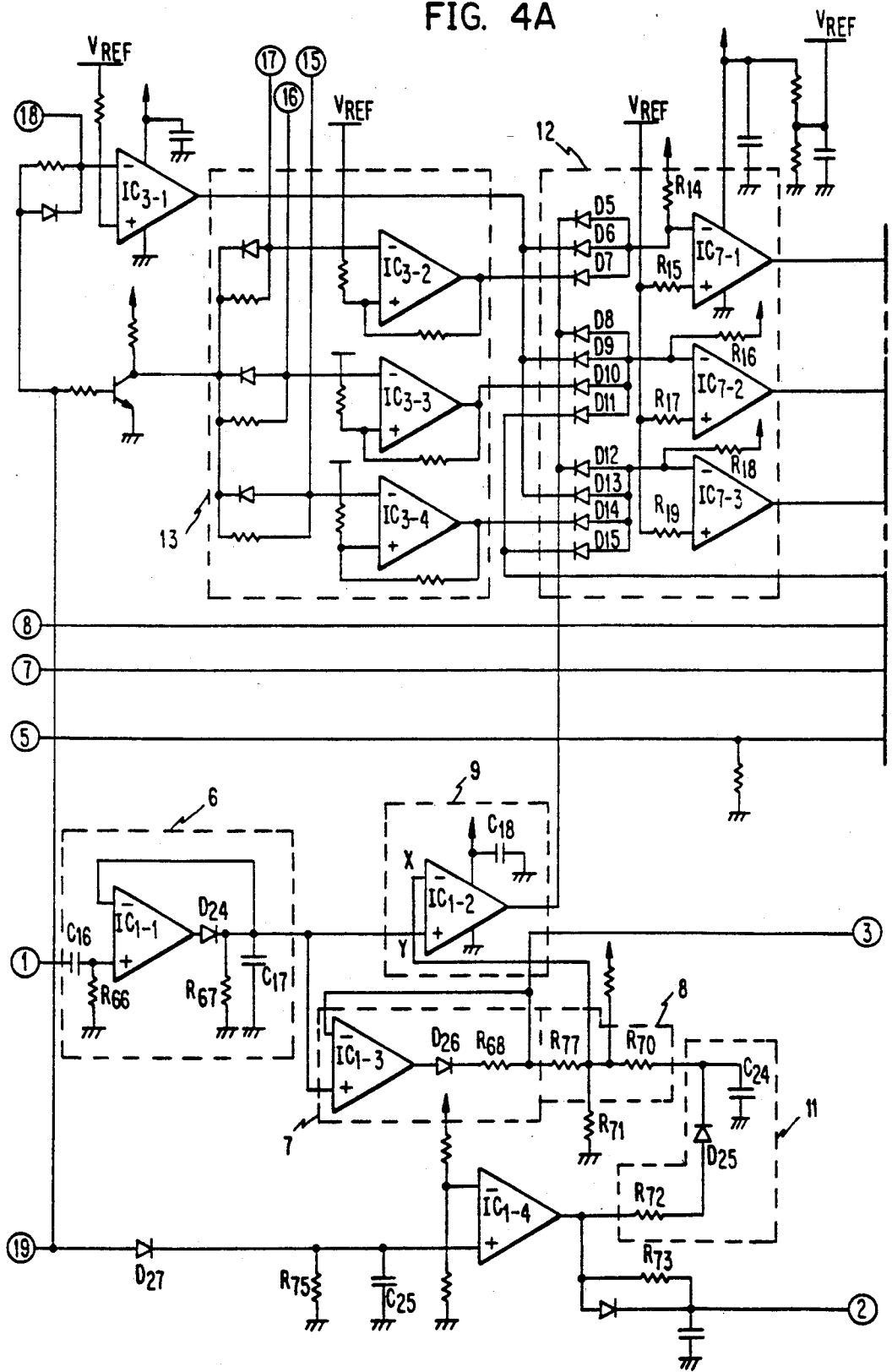

After elapsing of a certain period of time determined by the condenser C25 and the resistance R75, the trigger signals which are inputted into the pin 19 of FIG. 4 blocks the transistor TR5 for a certain period of time more through the function of a condenser CA of the AGC circuit 10.

If the transistor TR5 is opened, the amplifying transistor TR2 amplifies the signals as much as the gain decided by the resistance RA (to an intermediate level). After elapsing of time as much as decided by a resistance RC and a condenser CB of the AGC circuit 10, if the transistor TR6 is opened, the transistor TR2 amplifies the signals to the maximum as much as the gain decided by a resistance RB, thereby identifying the signals to be of a long distance.

The control device H-IC according to the present invention is additionally provided with a circuit which is capable of isolating the external noises from the proper signals, by varying the ratio of the signals to the noises over the time. That is, the short distance signals are sufficiently strong under the operating state of the AGC circuit 10, and therefore, the reference value for discriminating the signals is stepped up, while the reference value is stepped down for long distance signals. This function is carried out by a comparing device IC1-2 of FIG. 4 in the manner described below. That is, the impeding signals which have been inputted through the first terminal of the control device H-IC are let to pass through the filtering circuit 6 to be filtered there, and then, they are inputted into the comparing device IC1-2. The trigger signals (Y signals, i.e., the signals incoming through the 19th terminal) are constantly discharged to be compared with X signals which has a discharge gradient in the form of an exponential function. The impeding signals which thus been compared are distributed to function deciding devices IC7-1, IC7-2, IC7-3 of the function deciding circuit 12 where they are used as the inputs for deciding the function.

According to the present invention as described above, ultrasonic wave transmitting and receiving units are installed in such a manner that the return travel distances of the ultrasonic waves having a certain wave width can be time-processed, thereby making it possible to detect objects over a wide angular range. Further, a single circuit of the present invention is capable of performing: the alarming function of emitting an alarm against a car following behind upon encroaching the safety distance; the function of detecting an object appearing at a long distance in the rear during a reverse driving; and the function of realizing an exact close parking. Further, the amplifying circuit at the receiving section is provided with a temperature compensating circuit, in such a manner that the errors of the apparatus due to the variations of temperature should be prevented. Further, an AGC circuit is provided so that a gain control operation should be possible in accordance with time regardless of the magnitude of the distance.

What is claimed is:

1. An object detecting circuit for use in an automobile, comprising:
   an ultrasonic transmitting section, a receiving section, and a control device, said ultrasonic transmitting section including
   (i) a trigger circuit supplying a trigger signal,
   (ii) a transmission signal oscillation circuit responsive to said trigger signal for supplying an excitation signal of a predetermined frequency,
   (iii) a transmission signal amplifying circuit receiving said excitation signal for supplying an ultrasonic driver signal, and
   (iv) a transmitter receiving said ultrasonic driver signal and, in response, supplying ultrasonic acoustic energy;
   said receiving section including
   (i) an ultrasonic transducer responsive to reflected ultrasonic acoustic energy for supplying a detected ultrasonic signal,
   (ii) an automatic gain control circuit responsive to said trigger signal for supplying a gain control signal,
   (iii) a temperature compensating circuit responsive to an ambient temperature for supplying a temperature compensation signal,
   (iv) an amplifying circuit receiving said detected ultrasonic signal and, responsive to said gain control signal and said temperature compensation signal, supplying an amplified detected signal, and
   said control device including
   (i) a filtering circuit receiving said amplified detected signal and supplying a filtered detected signal,
   (ii) an integrating circuit receiving said filtered detected signal for supplying a first time integrated signal,
   (iii) a summing-adding circuit receiving said first time integrated signal and responsive to a threshold control signal for supplying a second time integrated signal,
   (iv) a comparator receiving said filtered detected signal and said second time integrated signal and, in response, supplying a first logic signal,
   (v) a detection level control circuit responsive to said trigger signal for supplying said threshold control signal,
   (vi) a reference time generating circuit responsive to said trigger signal for supplying first through third time reference signals,
   (vii) a function control circuit responsive to said first through third time reference signals and to said first logic signal for supplying first through third function signals,
   (viii) a first function circuit responsive to said first function signal for supplying a first alerting signal,
   (ix) a second function circuit responsive to said second function signal for supplying a second alerting signal,
   (x) a third function circuit responsive to said third function signal for supplying a third alerting signal, and
   (xi) a first and second function deciding circuit responsive to said first and second altering signals for supplying a composite alerting signal.

2. The object detecting apparatus as claimed in claim 1, wherein said automatic gain control circuit is installed between said control device and said received signal amplifying circuit, said automatic gain control circuit comprising:
   first and second gain controlling transistors connected in parallel, each having a control electrode receiving said trigger signal;
   a first condenser connected to the control electrode of said first transistor;
   a first resistance connected to a switched electrode of said first transistor;
   a second condenser and a second resistance connected to the control electrode of said second transistor; and
   a third resistance connected to a switched electrode of said second transistor, said first and second resistance supplying said gain control signal to said amplifying circuit.

3. The object detecting apparatus as claimed in claim 1, wherein said first function circuit comprises:
signal delaying and amplifying circuit receiving said first function signal;
a resistance having a first terminal connected to an output of said signal delaying and amplifying circuit;
a condenser connected to a second terminal of said resistance;
a first comparator having an input connected to said second terminal of said resistance;
a second comparator receiving an output from said first comparator and supplying said first alerting signal; and
a third comparator having an output connected to said input of said first comparator.

4. The object detecting apparatus as claimed in claim 1, wherein said second function circuit comprises:
a signal delaying and amplifying circuit receiving said second function signal;
a resistance having a first terminal receiving an output from said signal delaying and amplifying circuit;
a condenser connected to a second terminal of said resistance; and
a comparator having an input connected to said second terminal of said resistance.

5. The object detecting apparatus as claimed in claim 1, wherein said third function circuit comprises:
a signal delaying and amplifying circuit receiving said third function signal for supplying a first output signal;
a blinking signal frequency deciding resistance;
a first comparator responsive to said first output signal for supplying a second output signal; and
a second comparator responsive to said second output signal for supplying said third alerting signal,
said blinking signal frequency deciding resistance connected from an output to an input of said second comparator.

6. The object detecting apparatus as claimed in claim 1, wherein said amplifying circuit includes an output transistor and said temperature compensating circuit includes a series combination of a first resistance and a thermistor connected to a control terminal of said output transistor of said amplifying circuit and a second resistance connected in parallel with said series combination.

7. An object detecting circuit, comprising:
an ultrasonic transmitting section, a receiving section and a control device, said ultrasonic transmitting section including
(i) a trigger circuit supplying a trigger signal,
(ii) a transmission signal oscillation circuit responsive to said trigger signal for supplying an excitation signal of a predetermined frequency,
(iii) a transmission signal amplifying circuit responsive to said excitation signal for supplying an ultrasonic driver signal, and
(iv) a transmitter responsive to said ultrasonic driver signal and, in response, supplying ultrasonic acoustic energy;
said receiving section including
(i) an ultrasonic transducer responsive to reflected ultrasonic acoustic energy for supplying a detected ultrasonic signal,
(ii) an automatic gain control circuit responsive to said trigger signal for supplying a gain control signal,
(iii) a temperature compensating circuit responsive to an ambient temperature for supplying a temperature compensation signal,
(iv) an amplifying circuit responsive to said detected ultrasonic signal and said gain control signal and said temperature compensation signal, for supplying an amplified detected signal; and
said control device including
(i) a filtering circuit responsive to said amplified detected signal for supplying a filtered detected signal,
(ii) an integrating circuit responsive to said filtered detected signal for supplying a first time integrated signal,
(iii) a summing-adding circuit responsive to said first time integrated signal and to a threshold control signal for supplying a second time integrated signal,
(iv) a comparator responsive to said filtered detected signal and said second time integrated signal for supplying a first logic signal,
(v) a detection level control circuit responsive to said trigger signal for supplying said threshold control signal,
(vi) a reference time generating circuit responsive to said trigger signal for supplying first through third time reference signals,
(vii) a function control circuit responsive to said first through third time reference signals and to said first logic signal for supplying first through third function signals,
(viii) a first function circuit responsive to said first function signal for supplying a first alerting signal,
(ix) a second function circuit responsive to said second function signal for supplying a second alerting signal,
(x) a third function circuit responsive to said third function signal for supplying a third alerting signal, and
(xi) a first and second function deciding circuit responsive to said first and second altering signals for supplying a composite alerting signal.

8. An object detecting circuit, comprising:
ultrasonic transmitting means for radiating ultrasonic acoustic energy, receiving means for receiving reflected ultrasonic acoustic energy and control means for supplying a composite alerting signal in response to the received reflected ultrasonic energy, said ultrasonic transmitting means including
(i) trigger means for supplying a trigger signal,
(ii) oscillator means responsive to said trigger signal for supplying an excitation signal,
(iii) emitter means responsive to said excitation signal for radiating the ultrasonic acoustic energy;
said receiving means including
(i) ultrasonic transducer means responsive to the reflected ultrasonic acoustic energy for supplying a detected ultrasonic signal,
(ii) temperature compensating means responsive to an ambient temperature for supplying a temperature compensation signal,
(iii) detector means responsive to said detected ultrasonic signal and said temperature compensation signal for supplying an amplified detected signal; and said control means including
  (i) integrating means responsive to said amplified detected signal for supplying a time integrated signal,
  (ii) comparator means responsive to said amplified detected signal and said time integrated signal for supplying a first logic signal,
  (iii) reference time generating means responsive to said trigger signal for supplying first and second time reference signals,
  (iv) function control means responsive to said first and second time reference signals and to said first logic signal for supplying first and second function signals,
  (v) first function means responsive to said first function signal for supplying a first alerting signal,
  (vi) a second function means responsive to said second function signal for supplying a second alerting signal, and
  (vii) function deciding means responsive to said first and second altering signals for supplying the composite alerting signal.

9. The object detecting apparatus according to claim 8, wherein said reference time generating means further supplies a third time reference signal and said function control means is further responsive to said third time reference signal for supplying a third function signal, said control means further including third function means responsive to said third function signal for supplying a third alerting signal.

* * * * *